US008033194B2

(12) United States Patent
Suzuki

(10) Patent No.: US 8,033,194 B2
(45) Date of Patent: Oct. 11, 2011

(54) TRANSMISSION FOR VEHICLE WITH MULTI-GEAR SET

(75) Inventor: Hiroyuki Suzuki, Nishio (JP)

(73) Assignee: Aisin AI Co., Ltd., Nishio-Shi, Aichi-Ken (JP)

( * ) Notice: Subject to any disclaimer, the term of this patent is extended or adjusted under 35 U.S.C. 154(b) by 692 days.

(21) Appl. No.: 12/184,642

(22) Filed: Aug. 1, 2008

(65) Prior Publication Data

US 2009/0036251 A1 Feb. 5, 2009

(30) Foreign Application Priority Data

Aug. 2, 2007 (JP) ................ 2007-202023

(51) Int. Cl.
*F16H 3/08* (2006.01)
(52) U.S. Cl. ........................................ 74/331
(58) Field of Classification Search ........... 74/325, 74/329, 331, 333
See application file for complete search history.

(56) References Cited

U.S. PATENT DOCUMENTS

| 5,249,475 A * | 10/1993 | McAskill | 74/331 |
|---|---|---|---|
| 5,787,756 A * | 8/1998 | Leber et al. | 74/331 |
| 5,819,587 A * | 10/1998 | Leber et al. | 74/331 |
| 6,513,399 B2 * | 2/2003 | Lamela | 74/331 |
| 6,752,034 B2 * | 6/2004 | Huber et al. | 74/331 |
| 6,988,426 B2 * | 1/2006 | Calvert | 74/331 |
| 7,121,161 B2 * | 10/2006 | Hatakeyama | 74/359 |
| 7,395,728 B2 * | 7/2008 | Regenscheit | 74/331 |
| 7,421,920 B2 * | 9/2008 | Regenscheit | 74/331 |
| 7,454,991 B2 * | 11/2008 | Buck et al. | 74/331 |
| 2006/0230854 A1 | 10/2006 | Enstrom et al. | |

FOREIGN PATENT DOCUMENTS

| EP | 1 531 285 A1 | 5/2005 |
|---|---|---|
| EP | 1 531 286 A1 | 5/2005 |
| EP | 1 593 877 A1 | 11/2005 |
| JP | 2002-70960 A | 3/2002 |

OTHER PUBLICATIONS

Extended European Search Report issued by the European Patent Office in corresponding European Patent Application No. 08 01 3506, Dec. 8, 2009, EPO, The Hague, The Netherlands.

* cited by examiner

*Primary Examiner* — Ha D. Ho
(74) *Attorney, Agent, or Firm* — Buchanan Ingersoll & Rooney PC

(57) ABSTRACT

A transmission for a vehicle includes first to fourth counter shafts arranged in parallel with one input shaft, a reduction gear set including first to fourth reduction gears respectively provided at an output shaft and first to third counter shafts for connecting the output shaft and the corresponding counter shafts, an intermediate gear set including a driving gear, a driven gear and an idling gear for connecting the input shaft and the fourth counter shaft, and first to third gear mechanisms each provided between corresponding two shafts and each having two gear sets and one switching clutch provided between the corresponding two gear sets for selectively establishing a power transmitting path between the corresponding two shafts via one of the two gear sets or via the other one of the two gear sets.

5 Claims, 4 Drawing Sheets

TRANSMISSION FOR VEHICLE WITH MULTI-GEAR SET

CROSS REFERENCE TO RELATED APPLICATIONS

This application is based on and claims priority under 35 U.S.C. §119 to Japanese Patent Application 2007-202023, filed on Aug. 2, 2007, the entire content of which is incorporated herein by reference.

FIELD OF THE INVENTION

The present invention generally relates to a transmission for a vehicle with a multi-gear set.

BACKGROUND

In a front-engine front-drive type vehicle, in which an engine and a transmission are connected in an axial direction and are transversely mounted, various attempts have been made to reduce the size of the transmission and to enhance torque. For example, as disclosed in JP 2002-70960A (hereinafter, referred to as reference 1), one input shaft and two counter shafts are provided and plural gear sets are arranged in parallel to each other between the input shaft and each of the counter shafts, thereby reducing axial length of the transmission while including plural speed shift stages. FIG. 5 illustrates a transmission 1 which includes substantially the same structure as a second embodiment of the reference 1, in which six gear sets are provided. In a transmission case 2, an input shaft 3a and first and second counter shafts 3b, 3c are arranged in parallel to each other. Further, first to fourth gear sets are provided between the input shaft 3a and the first counter shaft 3b. A first switching clutch 5A is provided between the first gear set and the second gear set. A second switching clutch 5B is provided between the third gear set and the fourth gear set. Still further, fifth and sixth gear sets are provided between the input shaft 3a and the second counter shaft 3c. A third switching clutch 5C is provided between the fifth and sixth gear sets. The input shaft 3a is driven to rotate by the engine 10. The first and second counter shafts 3b and 3c are connected to output shafts 8a and 8b via final reduction gears 6a, 6b, 6c and a differential mechanism 7. Further, a reverse movement gear mechanism 4C, which includes a reverse gear set and a reverse switching clutch 5D, is provided between the second counter shaft 3c and a reverse shaft 3d arranged in parallel with the input shaft 3a.

According to the reference 1, in the transmission 1 including the six forward speed shift gear sets, a first gear mechanism 4A (including the first to fourth gear sets and the first and second switching clutches 5A, 5B) mounted between the input shaft 3a and the first counter shaft 3b and a second gear mechanism 4B (including the fifth and sixth gear sets and the third switching clutch 5C) mounted between the input shaft 3a and the second counter shaft 3c are arranged to be in parallel with each other. Accordingly, an entire axial length of the transmission 1 can be reduced in comparison with a transmission, in which gear mechanisms are provided between an input shaft and one counter shaft, in a case where the member of the speed shift stages is the same between such type of transmission and the transmission 1 disclosed in the reference 1. However, because the four forward movement gear sets (the first to fourth gear sets) and the two shifting clutches 5A, 5B are mounted to the first counter shaft 3b, the length of the first counter shaft 3b requires to be longer than that of the second counter shaft 3c, at which the two forward speed shift gear sets (the fifth and sixth gear sets) and the two shifting clutches 5C and 5D are provided, by the length of one gear set. Therefore, in a case where the length of the first counter shaft 3b and that of the second counter shaft 3c are arranged to be the same, a useless space is generated at the second counter shaft 3c.

A need thus exists for a transmission with a multi-gear set, which is not susceptible to the drawback mentioned above.

SUMMARY OF THE INVENTION

According to an aspect of the present invention, a transmission for a vehicle includes an input shaft adapted to be rotatably driven by an engine, an output shaft adapted to be connected to driving wheels, a first counter shaft arranged in parallel with the input shaft, a second counter shaft arranged in parallel with the input shaft, a third counter shaft arranged in parallel with the input shaft, a fourth counter shaft arranged in parallel with the input shaft, a reduction gear set, an intermediate gear set, a first gear mechanism, a second gear mechanism and a third gear mechanism. The reduction gear set includes a first reduction gear provided at the output shaft to transmit torque from the input shaft, a second reduction gear provided at the first counter shaft and engaged with the first reduction gear for connecting the first counter shaft and the output shaft, a third reduction gear provided at the second counter shaft and engaged with the first reduction gear for connecting the second counter shaft and the output shaft, and a fourth reduction gear provided at the third counter shaft and engaged with the first reduction gear for connecting the third counter shaft and the output shaft. The intermediate gear set includes a driving gear securely mounted to the input shaft, a driven gear securely mounted to the fourth counter shaft, and an idling gear rotatably mounted to the second counter shaft and engaged with the driving gear and the driven gear for connecting the input shaft and the fourth counter shaft. The first gear mechanism is provided between the first counter shaft and the fourth counter shaft. Further, the first gear mechanism includes a first gear set, a second gear set and a first switching clutch provided between the first and second gear sets to selectively establish a first power transmitting path between the first counter shaft and the fourth counter shaft via the first gear set and the first power transmitting path via the second gear set. The second gear mechanism is provided between the input shaft and the second counter shaft. Further, the second gear mechanism includes a third gear set, a fourth gear set and a second switching clutch provided between the third and fourth gear sets to selectively establish a second power transmitting path between the input shaft and the second counter shaft via the third gear set and the second power transmitting path via the fourth gear set. The third gear mechanism is provided between the input shaft and the third counter shaft. Further, the third gear mechanism including a fifth gear set, a sixth gear set and a third switching clutch provided between the fifth and sixth gear sets to selectively establish a third power transmitting path between the input shaft and the third counter shaft via the fifth gear set and the third power transmitting path via the sixth gear set.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
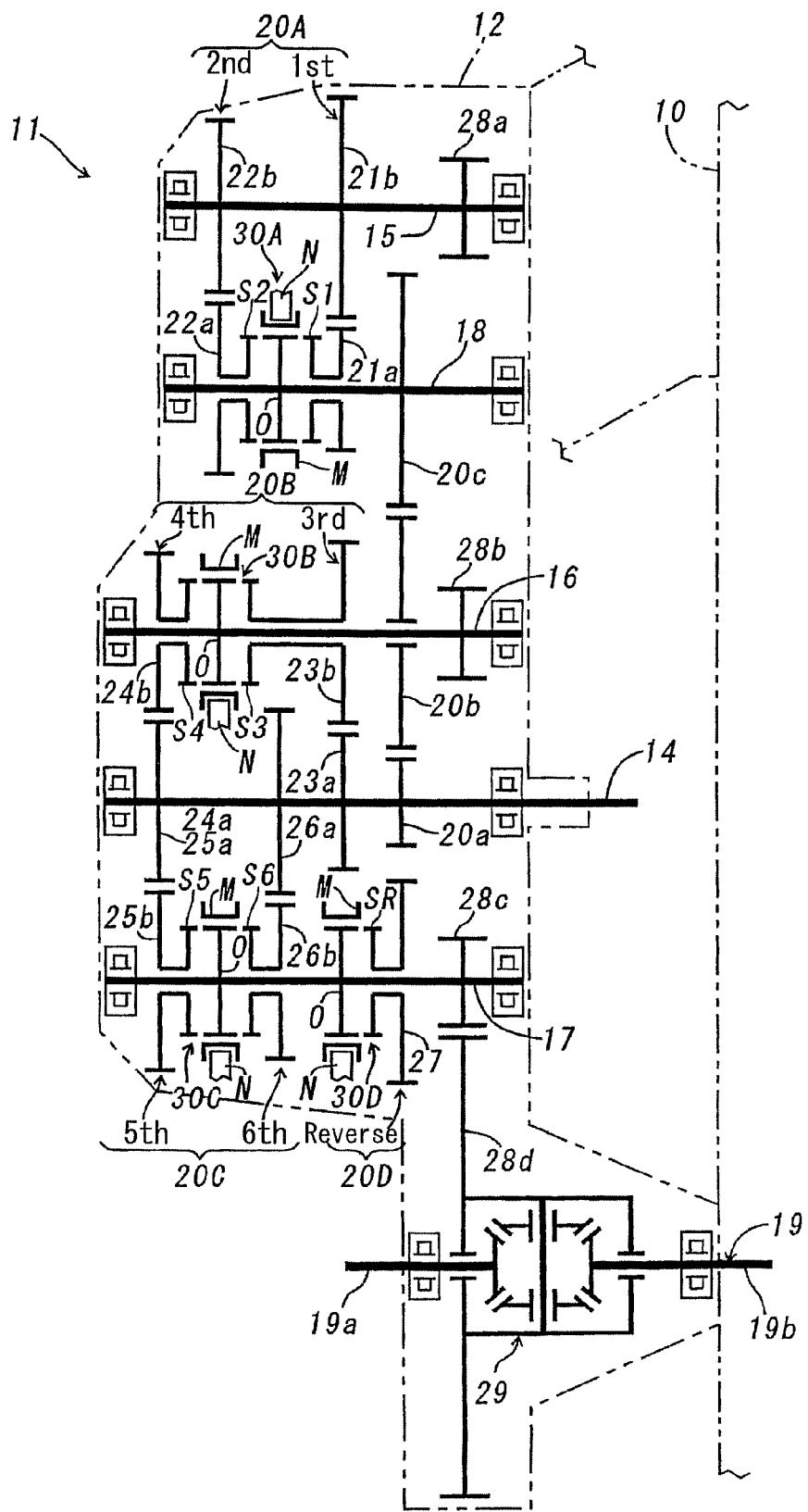
FIG. 1 is a schematic view illustrating an entire structure of a transmission with multiple shift stage, according to the present invention.
Figure 2:
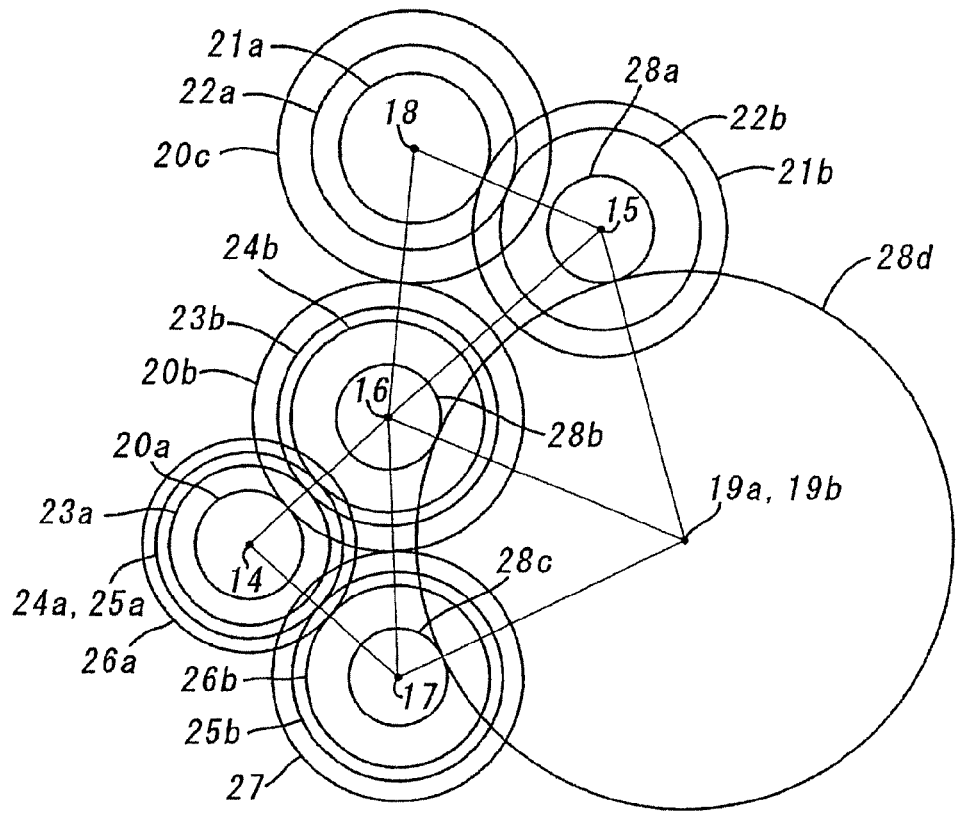
FIG. 2 is a side view illustrating an arranging manner of shafts and gears of the transmission seen from axially left side of FIG. 1.

An embodiment of the present invention will be described hereinafter with reference to FIGS. 1 to 3. As best shown in FIGS. 1 and 2, a transmission for a vehicle, generally indicated by reference numeral 11, is structured with an input shaft 14, first to fourth counter shafts 15, 16, 17, 18, an intermediate gear set (20a, 20b, 20c), a first gear mechanism 20A, a second gear mechanism 20B, a third gear mechanism 20C, a reverse movement gear mechanism 20D, an output shaft 19, a reduction gear set (28a, 28b, 28c and 28d), a differential mechanism 29 and a transmission case 12. The input shaft 14 and the first to fourth counter shafts 15 to 18 are arranged to be in parallel to one another and are rotatably supported. The intermediate gear set includes a driving gear 20a, an idling gear 20b and a driven gear 20c and connects the input shaft 14 and the fourth counter shaft 18. The first gear mechanism 20A is provided between the first counter shaft 15 and the fourth counter shaft 18. The second gear mechanism 20B is provided between the input shaft 14 and the second counter shaft 16. The third and fourth gear mechanisms 20C and 20D are provided between the input shaft 14 and the third counter shaft 17. The output shaft 19 is connected to driving wheels (not illustrated). The reduction gear set includes small reduction gears 28a, 28b, 28c and a large reduction gear 28d, which connect the first to third counter shaft 15, 16, 17 to the output shaft 19. The transmission case 12 supports such components. As best shown in FIG. 2, the first and fourth counter shafts 15 and 18 are provided vertically further upwardly than the input shaft 14 and the second and third counter shafts 16 and 17.

Figure 3:
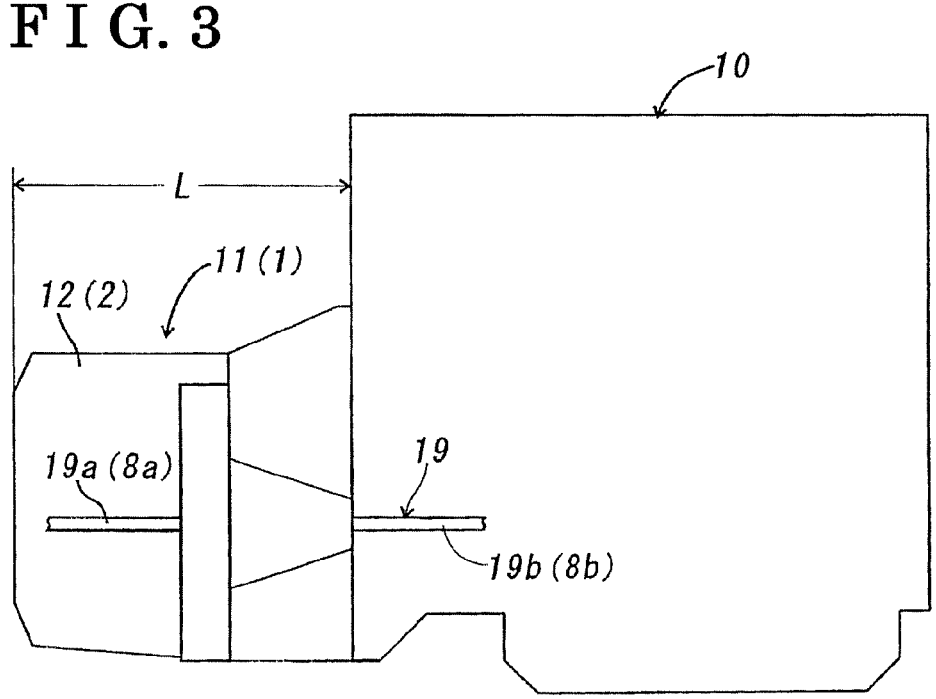
FIG. 3 is a side view illustrating a driving unit, in which the transmission with the multiple shift stage is securely transversely arranged to be provided at one axial side of an engine.

As illustrated in FIGS. 1 and 3, the transmission 11 is transversely provided at one axial side of an engine 10 so as to be coaxial therewith. The transmission case 12 is secured to the engine 10 and the input shaft 14 is connected to an output shaft of the engine 10 (not illustrated) via a clutch (not illustrated). The output shaft 19 is structured with a first shaft portion 19a and a second shaft portion 19b, which are connected via the differential mechanism 29. The first and second shaft portions 19a and 19b are rotatably supported by the transmission case 12 and are connected to corresponding driving wheels (not illustrated), respectively, via joints and drive shafts (not illustrated). The large reduction gear 28d (serving as a first reduction gear) is provided at the output shaft 19 via the differential mechanism 29. A diameter of the large reduction gear 28d is greater than that of each of the small reduction gears 28a, 28b and 28c. The small reduction gear 28a (serving as a second reduction gear) is connectedly provided at the first counter shaft 15 at an end portion thereof which is adjacent to the engine 10. The small reduction gear 28b (serving as a third reduction gear) is connectedly provided at the second counter shaft 16 at an end portion thereof which is adjacent to the engine 10. The small reduction gear 28c (serving as a fourth reduction gear) is connectedly provided at the third counter shaft 17 at an end portion thereof which is adjacent to the engine 10. Further, as best shown in FIG. 2, the small reduction gears 28a, 28b and 28c are engaged with the large reduction gear 28d so as to transmit torque from the input shaft 14 to the output shaft 19.

As illustrated in FIG. 1, the intermediate gear set includes the driving gear 20a, the idling gear 20b and the driven gear 20c. The driving gear 20a is securely mounted to the input shaft 14 and the driven gear 20c is securely mounted to the fourth counter shaft 18, respectively. The idling gear 20b is rotatably mounted to the second counter shaft 16 and is engaged with the driving gear 20a and the driven gear 20c. Thus, the intermediate gear set (20a, 20b, 20c) normally connects the input shaft 14 and the fourth counter shaft 18. The reduction gear set (28a, 28b, 28c and 28d), the intermediate gear set (20a, 20b and 20c) and the first to third gear mechanisms 20A to 20C are arranged in order from the engine 10, i.e., the first to third gear mechanisms 20A to 20C are furthest from the engine 10.

The intermediate gear set (20a, 20b and 20c) and the first gear mechanism 20A establish 1st and 2nd speed stages. The first gear mechanism 20A is structured with a first forward movement gear set (serving as a first gear set) including a driving gear 21a and a driven gear 21b, a second forward movement gear set (serving as a second gear set) including ha driving gear 22a and a driven gear 22b, and a first switching clutch 30A. The first forward movement gear set (21a, 21b) and the second forward movement gear set (22a, 22b) are provided between the first counter shaft 15 and the fourth counter shaft 18. More specifically, the driving gears 21a and 22a of the first and second forward movement gear sets are rotatably supported to the fourth counter shaft 18. The driven gears 21b and 22b of the first and second forward movement gear sets are securely connected to the first counter shaft 15. The first switching clutch 30A is provided between the driven gears 21a and 22a of the first and second forward movement gear sets.

The first switching clutch 30A, which is structured by a known synchromesh mechanism, includes a clutch hub O, a sleeve M and engagement members S1 and S2. The clutch hub O is secured to the fourth counter shaft 18. The sleeve M is axially slidably spline-engaged with an outer periphery of the clutch hub O. The engagement members S1 and S2 are respectively provided at axial sides of the clutch hub O and are respectively secured to the driving gears 21a and 22a of the first and second forward movement gear sets. As described above, the first switching clutch 30A is provided between the first and second forward movement gear sets so as to selectively establish a first power transmitting path between the first counter shaft 14 and the fourth counter shaft 18 via the first forward movement gear set 21a, 21b and the first power transmitting path via the second forward movement gear set 22a, 22b. More specifically, with reference to FIG. 1, when the sleeve M of the first switching clutch 30A is shifted towards a right direction (i.e., to the driving gear 21a) from a neutral position as illustrated therein by means of a shift fork N, the sleeve M is spline-engaged with the engagement member S1 and the first driving gear 21a is engaged with the fourth counter shaft 18, thereby establishing the 1st speed stage. Accordingly, drive torque inputted to the input shaft 14 from the engine 10 is transmitted to the output shaft 19 via the intermediate gear set 20a, 20b, 20c, the fourth counter shaft 18, the first forward movement gear set 21a and 21b, the first counter shaft 15, the reduction gears 28a and 28b and the differential mechanism 29. Then, when the sleeve M of the first switching clutch 30A is shifted towards a left direction (i.e., to the driving gear 22a) in such a state, the driving gear 21a is disengaged from the fourth counter shaft 18 and the 1st speed stage is cancelled. At the same time, the sleeve M is engaged with the engagement member S2 and the second driving gear 22a is engaged with the fourth counter shaft 18, thereby establishing the 2nd speed stage. Accordingly, the drive torque inputted to the input shaft 14 is transmitted to the output shaft 19 in the same manner as described above. When the sleeve M is returned to the neutral position, the driving gear 22a is disengaged from the fourth counter shaft 18 and the 2nd speed stage is cancelled.

The second gear mechanism 20B establishes 3rd and 4th speed stages. The second gear mechanism 20B is structured with a third forward movement gear set (serving as a third gear set) including a driving gear 23a and a driven gear 23b, a fourth forward movement gear set (serving as a fourth gear set) including a driving gear 24a and a driven gear 24b and a second switching clutch 30B. The third forward movement gear set (23a, 23b) and the fourth forward movement gear set (24a, 24b) are provided between the input shaft 14 and the second counter shaft 16. A structure and function of the second switching clutch 30B is substantially the same as that of the first switching clutch 30A. The second switching clutch 30B is provided between the third and fourth forward movement gear set so as to selectively establish a second power transmitting path between the input shaft 14 and the second counter shaft 16 via the third forward movement gear set and the second power transmitting path via the fourth forward movement gear set. With reference to FIG. 1, when a sleeve M of a second switching clutch 30B is shifted towards the right direction (i.e., to the driven gear 23b) from a neutral position as illustrated therein by means of a shift fork N of the second gear mechanism 20B, the sleeve M is spline-engaged with an engagement member S3 and the driven gear 23b of the third forward movement gear set is engaged with the second counter shaft 16, thereby establishing the 3rd gear stage. Accordingly, the drive torque inputted to the input shaft 14 is transmitted to the output shaft 19 via the third forward movement gear set (23a and 23b), the second counter shaft 16, the reduction gears 28b, 28d and the differential mechanism 29. Then, when the sleeve M of the second switching clutch 30B is shifted towards the left direction (i.e., to the driven gear 24b) in such a state, the 3rd speed stage is cancelled and at the same time, the driven gear 24b of the fourth forward movement gear set is engaged with the second counter shaft 16, thereby establishing the 4th speed stage. When the sleeve M is returned to the neutral position, the 4th speed stage is cancelled.

The third gear mechanism 20C establishes 5th and 6th speed stages. The third gear mechanism 20C is structured with a fifth forward movement gear set (serving as a fifth gear set) including a driving gear 25a and a driven gear 25b, a sixth forward movement gear set (serving as a sixth gear set) including a driving gear 26a and a driven gear 26b and a third switching clutch 30C. The fifth gear set (25a, 25b) and the sixth gear set (26a, 26b) are provided between the input shaft 14 and the third counter shaft 17. The driving gear 25a of the fifth forward movement gear set commonly serves as the driving gear 24a of the fourth forward movement gear set. On the other hand, the driving gear 26a of the sixth forward movement gear set and the driving gear 23a of the third forward movement gear set are provided separately. A structure and function of the second switching clutch 30B is substantially the same as that of the first and second switching clutches 30A and 30B. The third switching clutch 30C is provided between the fifth and sixth forward movement gear sets so as to selectively establish a third power transmitting path between the input shaft 14 and the third counter shaft 17 via the fifth forward movement gear set (25a, 25b) and the third power transmitting path via the sixth forward movement gear set (26a, 26b). When a sleeve M of a third switching clutch 30C is shifted towards the left direction (i.e., to the driven gear 25b) from a neutral position as illustrated therein by means of a shift fork N of the third gear mechanism 20C, the sleeve M is spline-engaged with an engagement member S5 and the driven gear 25b of the fifth forward movement gear set is engaged with the third counter shaft 17, thereby establishing the 5th speed stage. Accordingly, the drive torque inputted to the input shaft 14 is transmitted to the output shaft 19 via the fifth forward movement gear set 25a and 25b, the third counter shaft 17, the reduction gears 28c, 28d and the differential mechanism 29. Then, when the sleeve M of the third switching clutch 30C is shifted towards the right direction (i.e., to the driven gear 26b) in such a state, the 5th speed stage is cancelled and at the same time, the sixth driven gear 26b is engaged with the third counter shaft 17, thereby establishing a 6th speed stage. Then, the drive torque inputted to the input shaft 14 is transmitted to the output shaft 19 via the sixth forward movement gear set 26a and 26b, the third counter shaft 17, the reduction gears 28c, 28d and the differential mechanism 29. When 20 the sleeve M is returned to the neutral position, the 6th speed stage is cancelled.

A reverse movement gear mechanism 20D, the driving gear 20a and the idling gear 20b of the intermediate gear set establish a reverse stage. More specifically, as illustrated in FIG. 1, the reverse movement gear mechanism 20D is provided between the third gear mechanism 20C and the third small reduction gear 28c and arranged to be in parallel with the 25 third gear mechanism 20C. Further, the reverse movement gear mechanism 20D is structured with a reverse gear 27, which is rotatably mounted on the third counter shaft 17, and a reverse switching clutch 30D. The reverse gear 27 is aligned with the intermediate gear set (20a, 20b, 20c) in a direction being perpendicular to the axial direction. The reverse switching clutch 30D is aligned with the third forward movement gear set (23a and 23b) in the direction being perpendicular to the axial direction. The reverse gear 27 is engaged with the idling gear 20b of the intermediate gear set. The reverse switching clutch 30D includes an engagement member SR which is securely provided at one axial side of a clutch hub O of the reverse switching clutch 30D. A structure of other portions of the reverse switching clutch 30D is substantially the same as the first to third switching clutch 30A to 30C. When a sleeve M of the reverse switching clutch 30D is shifted towards the right direction (i.e., towards the reverse gear 27) from a neutral position, the sleeve M is spline-engaged with the engagement member SR and the reverse gear 27 is engaged with the third counter shaft 17, thereby establishing a reverse stage. Accordingly, the drive torque inputted to the input shaft 14 is transmitted to the output shaft 19 via the driving gear 20a and the idling gear 20b of the intermediate gear set, the reverse gear 27, the third counter shaft 17, the reduction gears 28c and 28b and the differential mechanism 29. Then, when the sleeve M of the reverse switching clutch 30D is returned to the neutral position, the reverse gear 27 is disengaged from the third counter shaft 17 and the reverse stage is cancelled.

Figure 5:
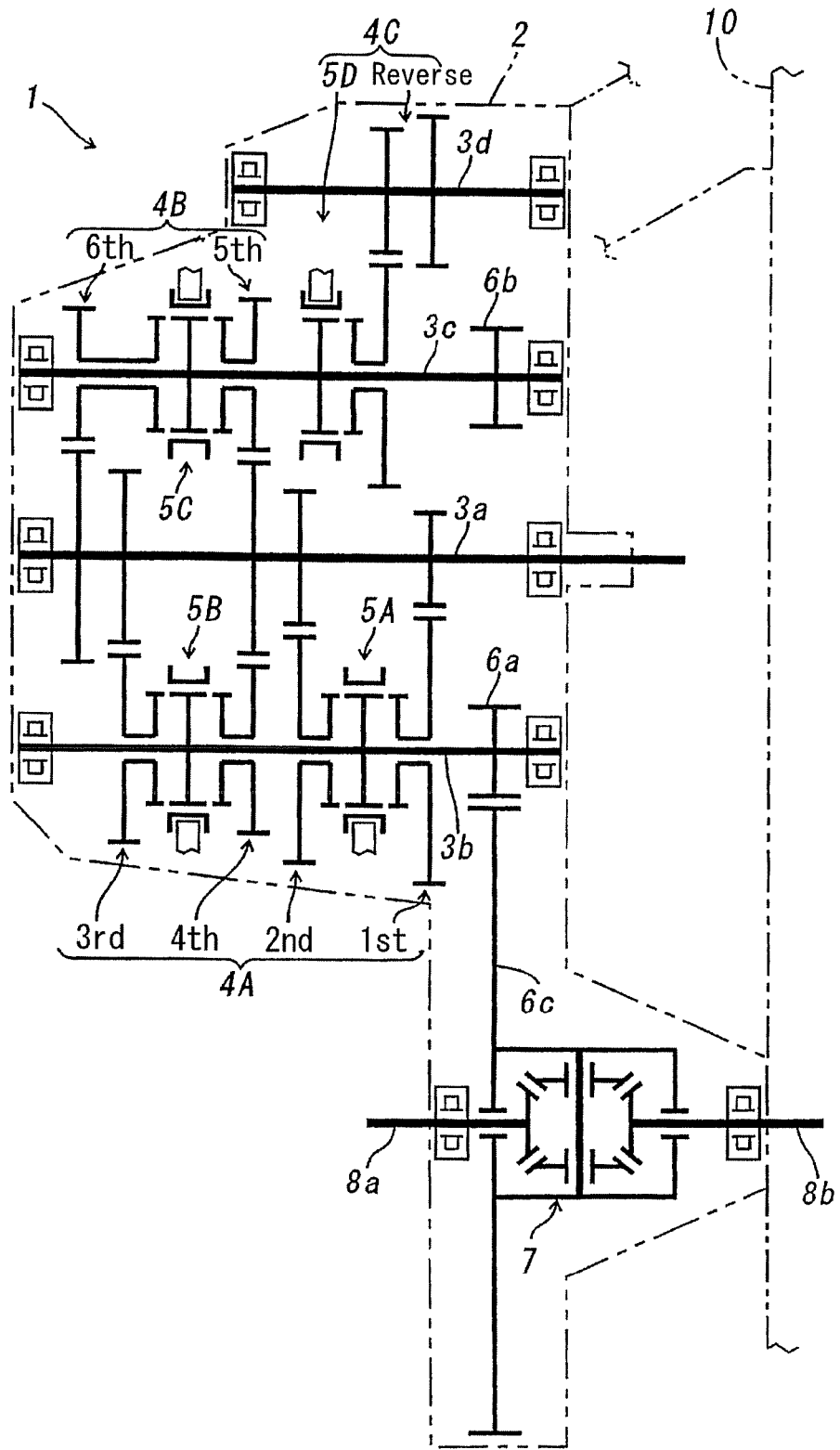
FIG. 5 is a schematic view illustrating an example of an entire structure of a conventional transmission including six forward movement gear sets.

According to the embodiment described above, the third counter shaft 17 is provided with the largest number of members (gears and clutches) among the input shaft 14 and the first to fourth counter shafts 15 to 18. As described above, the third and fourth gear mechanisms 20C and 20D and the third small reduction gear 28c are mounted on the third counter shaft 17. More specifically, the driven gears 25b and 26b, the reverse gear 27, the small reduction gear 28c and the third and reverse switching clutches 30C and 30D are mounted on the third counter shaft 17. On the contrary, according to the known art illustrated in FIG. 5, the first counter shaft 3b is provided with the largest number of members. With reference to FIG. 5, five gears (first to fourth speed driven gears and a first small reduction gear 6a) and switching clutches 5A, 5B are mounted on the first counter shaft 3b. In other words, the number of members mounted on the third counter shaft 17 according to the above described embodiment is smaller than the number of members mounted to the first counter shaft 3b according to the known art by one gear. Further, according to the above described embodiment, the reverse switching clutch 30D from among the third and reverse switching clutches 30C and 30D, both which are mounted on the third counter shaft 17, is operated at only one side. Therefore, in comparison with the known art, in which the first counter shaft 3b is provided with two switching clutches 5A and 5B operated at both axial sides, operational stroke of the reverse switching clutch 30D according to the above described embodiment is arranged to be shorter. Thus, according to the embodiment, an axial length L of the entire transmission 11 having six forward movement gear sets is reduced in comparison with the known art illustrated in FIG. 5.

According to the embodiment, the transmission 11 is transversely connected to the engine 10 in the axial direction. The intermediate gear set (20a, 20b, 20c) is located between the engine 10 and the first to third gear mechanisms 20A, 20B and 20C (i.e., the intermediate gear set is located to be closer to the engine 10 than the first to third gear mechanisms 20A, 20B and 20C are), and the reverse switching clutch 30D is provided between the reverse gear 27 and the third gear mechanism 20C. Due to such structure, the reverse gear 27 provided at the third counter shaft 17 and engaged with the idling gear 20b of the intermediate gear set is located at a position corresponding to the intermediate gear set (the driving gear 20a, the idling gear 20b and the driven gear 20c). Further, the reverse switching clutch 30D is operated only at one axial side thereof. Therefore, the third gear mechanism 20C is arranged more adjacently to the engine 10 because of a length of the reverse switching clutch 30D. Accordingly, an axial length of a portion of the transmission 11, at which the reverse switching clutch 30D is provided (i.e., the third counter shaft 17), is reduced to be shorter than an axial length of other portions. Thus, an axial length of a part of the transmission 11 is further reduced.

Further, with reference to FIG. 1, the transmission 11 is coaxially integrally connected to the engine 10 at a left side of the engine 10. Therefore, a length of a driving unit, in which the engine 10 and the transmission 11 are axially connected and of which entire length is in a tendency of being enlarged, can be reduced.

Still further, in such transmission in which plural counter shafts (two counter shafts, for example) are provided relative to one input shaft and plural forward movement gear sets (two forward movement gear sets, for example) are provided between the input shaft and each of the counter shafts (i.e., two forward movement gear sets are provided between one counter shaft and the input shaft, while another two forward movement gear sets are provided between another counter shaft and the input shaft), driving gears of the two forward movement gear sets provided at one counter shaft may be commonly used as driving gears of the other two forward movement gear sets provided at the other counter shaft. With the foregoing construction, an axial length of the transmission may be reduced. However, according to such structure, speed gear ratios of the two forward movement gear sets commonly using one driving gear are not changed flexibly. Thus, the speed ratio of each speed stage of the four forward movement gear sets may not be changed in a desired condition (for example, in a geometrical condition). On the other hand, according to the above described embodiment, the driving gear 25a of the fifth forward movement gear set and the driving gear 24a of the fourth forward movement gear set are commonly used, however, the driving gear 26a of the sixth forward movement gear set and the driving gear 23a of the third forward movement gear set are provided separately and are not commonly used. Thus, the speed ratio of the third forward movement gear set and of the six forward movement gear set may be chosen flexibly. Accordingly, a flexibility of the gear ratio, or degree of freedom for choosing gear ratios, of each speed stage is maintained. In addition, the third forward movement gear set (23a, 23b) is aligned with the reverse switching clutch 30D in the direction perpendicular to the axial direction of the transmission. Therefore, a useless space may not be generated.

The embodiment described above relates to the transmission including the reverse movement gear mechanism 20D. Alternatively, the embodiment described above may be applied to a transmission without a reverse movement gear mechanism. Due to the above described structure, any shaft, which is provided with one reduction gear of the reduction gear set (28a to 28d), one gear of the intermediate gear set (the driving gear 20a, the driven gear 20c and the idling gear 20b) and one of the first to third gear mechanisms 20A to 20C, is provided with the largest number of members (gears and clutch) from among the input shaft 14 and the first to fourth counter shafts 15 to 18. More specifically, four gears (one reduction gear from the reduction gear set, one gear from the intermediate gear set, and two forward movement gear sets) and one switching clutch are mounted on the shaft. On the contrary, according to known transmission, five gears (one reduction gear and four forward movement gears) and two clutches are mounted on one shaft provided with the largest number of members. Therefore, the number of members mounted on the shaft provided with the largest number of members according to the above described structure (the embodiment described above) is smaller than the number of members mounted on the shaft provided with the largest number of members according to the known transmission by one gear and one clutch. Thus, due to the above described structure, an axial length L of the entire transmission with multi-gear set is reduced in comparison with the known transmission.

Figure 4:
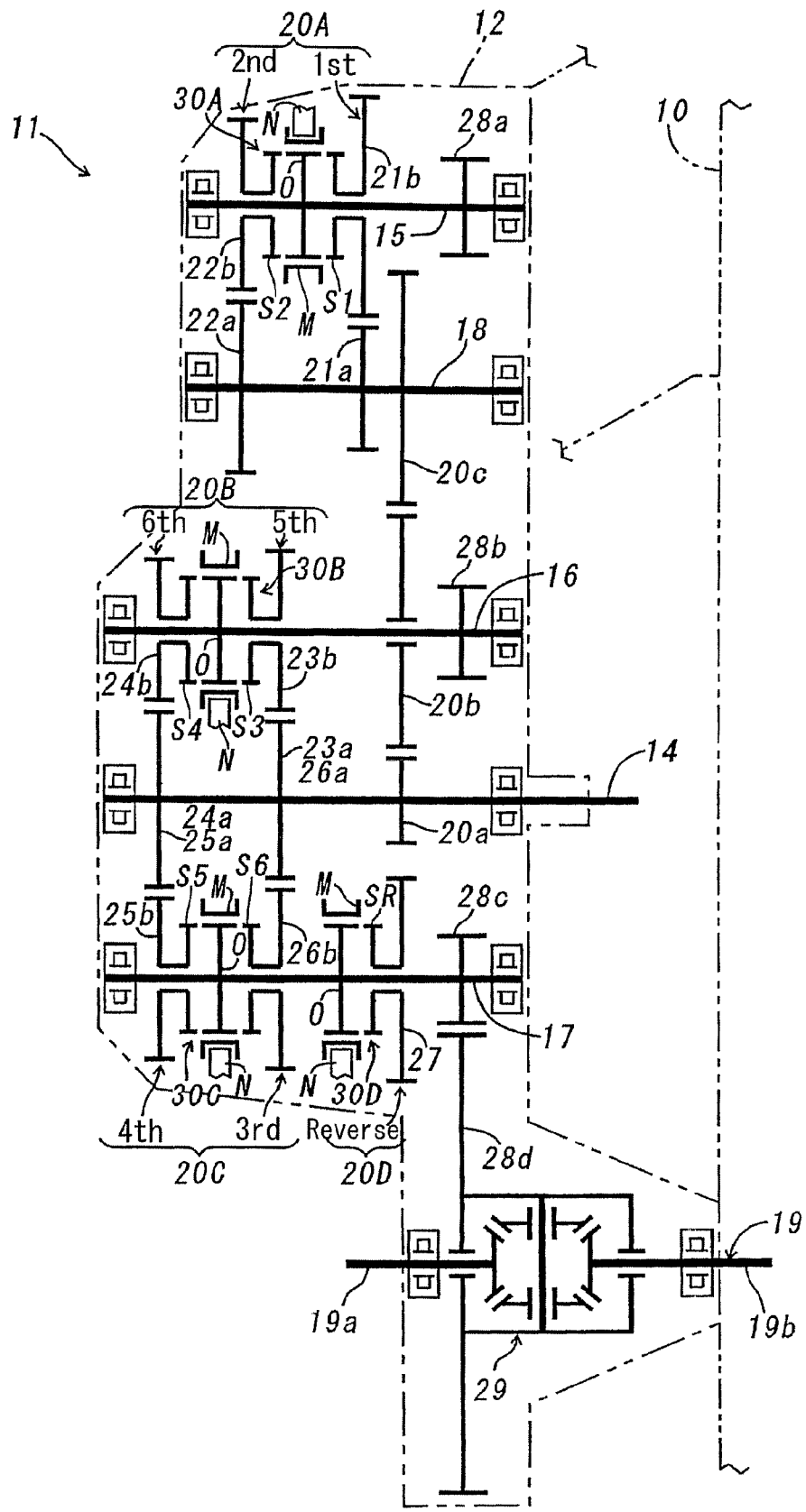
FIG. 4 is an entire view illustrating an entire structure of a transmission with multiple shift stage, according to a modified embodiment.

A modified embodiment will be described hereinafter with reference to FIG. 4. In the modified embodiment, the first switching clutch 30A of the first gear mechanism 20A is provided at the first counter shaft 15, not at the fourth counter shaft 18. Further, the second gear mechanism 20B provided between the input shaft 14 and the second counter shaft 16 establishes the 5th and 6th speed stages. Still further, the third gear mechanism 20C provided between the input shaft 14 and the third counter shaft 17 establishes the 3rd and 4th speed stages. Thus, the third forward movement gear set (the driving gear 23a and the driven gear 23b) establishes the 5th speed stage. The fourth forward movement gear set (the driving gear 24a and the driven gear 24b) establishes the 6th speed stage. Further, the fifth forward movement gear set (the driving gear 25a and driven gear 25b) establishes the 4th speed stage. Still further, the sixth forward movement gear set (the driving gear 26a and driven gear 26b) establishes the 6th speed stage. According to the modified embodiment, the driving gear 26a for the 3rd speed stage commonly serves as the driving gear 23a for the 5th speed stage. Further, the driving gear 25a for the 4th speed stage commonly serves as the driving gear 24a for the 6th speed stage. Since a structure of other portions of the transmission 11 and effects are substantially the same as the embodiment described above, a detailed description will be omitted herein.

Additionally, according to the above described embodiments, the first forward movement gear set 21a, 21b is assigned as the 1st speed stage, and the second forward movement gear set 22a, 22b is assigned as the 2nd speed stage. The third forward movement gear set 23a, 23b is assigned as the 3rd speed stage or the 5th speed stage, and the fourth forward movement gear set 24a, 24b is assigned as the 4th speed stage or the 6th speed stage. The fifth forward movement gear set 25a, 25b is assigned as the 5th speed stage or the 4th speed stage, and the sixth forward movement gear set 26a, 26b is assigned as the 6th speed stage or the 3rd speed stage. However, each shift stages may be assigned as any desired forward movement gear sets arranged at the positions illustrated in FIGS. 1 and 4.

Further, according to the above described embodiments, the first and fourth counter shafts 15 and 18 are provided vertically further upwardly than the input shaft 14 and the second and third counter shafts 16 and 17, and the idling gear 20b of the intermediate gear set is provided at the second counter shaft 16. Alternatively, the first and fourth counter shafts 15 and 18 may be provided vertically further downwardly than the input shaft 14 and the second and third counter shafts 16 and 17, and the idling gear 20b of the intermediate gear set my be provided at the third counter shaft 17. In such a case, the third counter shaft 17 serves as a second counter shaft to which the idling gear is rotatably mounted.

Still further, in the above described embodiments, the transmission 11 and the engine 10, which are adapted to the front-engine front-drive type vehicle, is described. However, the present invention is not limited to be adapted to the front-engine front-drive type vehicle, however, the present invention is also adaptable to a rear-engine rear-drive type vehicle.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A transmission for a vehicle, comprising:
an input shaft adapted to be rotatably driven by an engine;
an output shaft adapted to be connected to driving wheels;
a first counter shaft arranged in parallel with the input shaft;
a second counter shaft arranged in parallel with the input shaft;
a third counter shaft arranged in parallel with the input shaft;
a fourth counter shaft arranged in parallel with the input shaft;
a reduction gear set including a first reduction gear provided at the output shaft to transmit torque from the input shaft, a second reduction gear provided at the first counter shaft and engaged with the first reduction gear for connecting the first counter shaft and the output shaft, a third reduction gear provided at the second counter shaft and engaged with the first reduction gear for connecting the second counter shaft and the output shaft, and a fourth reduction gear provided at the third counter shaft and engaged with the first reduction gear for connecting the third counter shaft and the output shaft;
an intermediate gear set including a driving gear securely mounted to the input shaft, a driven gear securely mounted to the fourth counter shaft, and an idling gear rotatably mounted to the second counter shaft and engaged with the driving gear and the driven gear for connecting the input shaft and the fourth counter shaft;
a first gear mechanism provided between the first counter shaft and the fourth counter shaft, the first gear mechanism including a first gear set, a second gear set and a first switching clutch provided between the first and second gear sets to selectively establish a first power transmitting path between the first counter shaft and the fourth counter shaft via either the first gear set or the second gear set;
a second gear mechanism provided between the input shaft and the second counter shaft, the second gear mechanism including a third gear set, a fourth gear set and a second switching clutch provided between the third and fourth gear sets to selectively establish a second power transmitting path between the input shaft and the second counter shaft via either the third gear set or the fourth gear set; and
a third gear mechanism provided between the input shaft and the third counter shaft, the third gear mechanism including a fifth gear set, a sixth gear set and a third switching clutch provided between the fifth and sixth gear sets to selectively establish a third power transmitting path between the input shaft and the third counter shaft via either the fifth gear set or the sixth gear set.

2. A transmission for a vehicle according to claim 1, further comprising:
a reverse movement gear mechanism including a reverse gear rotatably provided at the third counter shaft and engaged with the idling gear of the intermediate gear set, and a reverse switching clutch engaging and disengaging the reverse gear with and from the third counter shaft.

3. A transmission for a vehicle according to claim 2, wherein
the transmission is coaxially connected to the engine,
the intermediate gear set is provided between the engine and the first to third speed shift mechanisms, and
the reverse switching clutch is provided between the reverse gear and the third gear mechanism.

4. A transmission for a vehicle according to claim 1, wherein
the transmission is coaxially connected to the engine.

5. A transmission for a vehicle according to claim 2, wherein
the transmission is coaxially connected to the engine.

* * * * *